KELLOGG & GILLET.
Wool and Cotton Picker.
No. 1,575.
Patented April 30, 1840.
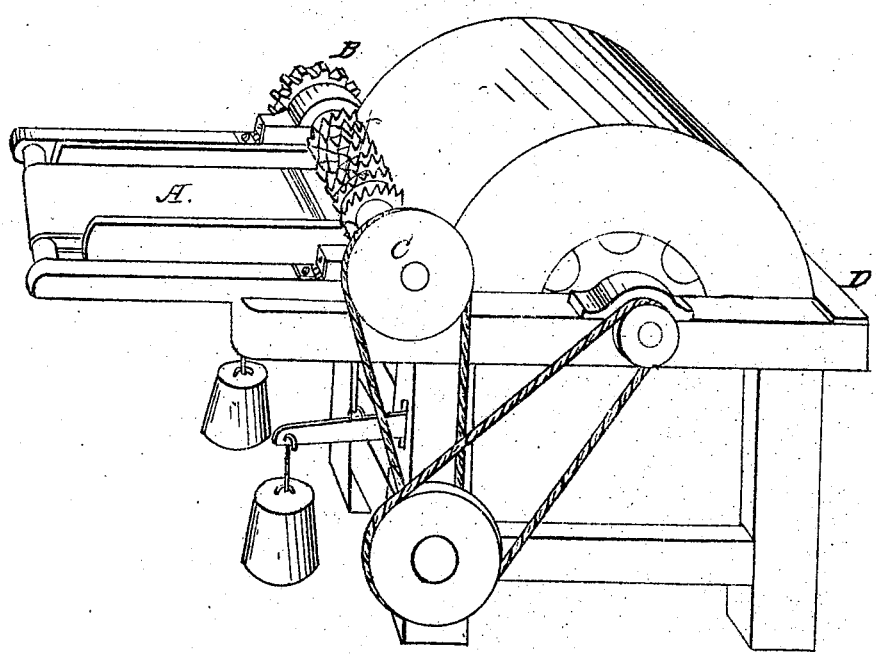
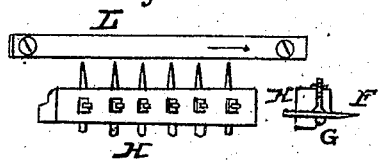
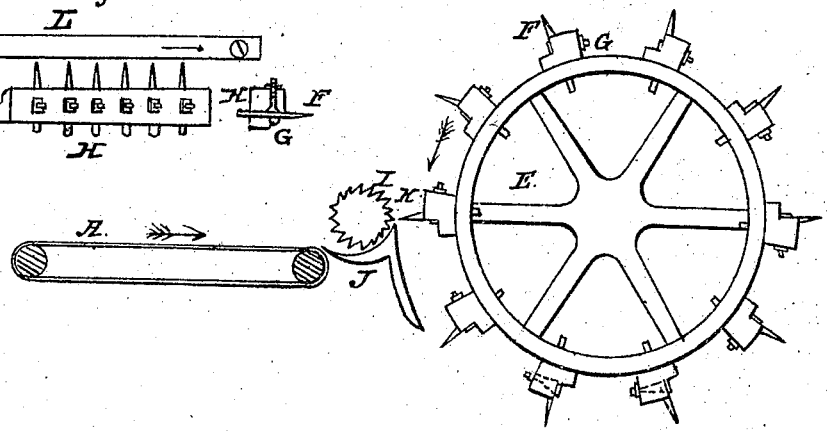

UNITED STATES PATENT OFFICE.

GEO. C. KELLOGG AND PHINEAS GILLET, OF NEW HARTFORD, CONNECTICUT.

MACHINE FOR PICKING AND OPENING WOOL, COTTON, AND OTHER FIBROUS SUBSTANCES.

Specification of Letters Patent No. 1,575, dated April 30, 1840.

*To all whom it may concern:*

Be it known that we, GEO. C. KELLOGG and PHINEAS GILLET, of New Hartford, in the county of Litchfield and State of Connecticut, have invented new and useful Improvements in the Picking and Opening of Wool, Cotton, and other Fibrous Substances Preparatory to Manufacturing Them; and we do hereby declare that the following is a full and exact description.

The nature of our invention consists in an improved mode of feeding the wool or other fibrous substances into the picking machine, and an improved mode of setting and holding firmly the picker teeth into the bags of the main cylinder.

To enable others skilled in the art to make and use our improvements we will proceed to describe them, and also the old method which has been more commonly used, and the comparative operation of the old and new; and in order to make the description as plain and concise as possible we will refer directly to the drawings, which represent the most common form with our improvements attached.

We build them in all the variety of forms and sizes to suit the order, or magnitude of the work required, and our improvements are applicable to old and new pickers of every form.

Figure 1 represents a picking machine with the internal bands on, and ready to receive the main belt on the opposite side to connect it, with the mill or motive power.

A is a creeper cloth which is moved by a gear on the end of the creeper cloth roll, which matches with and is moved by the gear wheel B which is fastened on to the end of the feeder shaft. These gears should be of such diameter as to give the creeper cloth nearly the same superficial speed of the feeder. The wool, cotton, or other substance to be picked is spread upon said creeper cloth.

G is one feeder weighted down having a concave metallic shell placed under it (which occupies the place of another feeder in the old form). The underside of said feeeder moves with the creeper cloth, and both toward the machine, or picker cylinder, which is inclosed in a bonnet or covering on the top, and a grating underneath to let the motes and dust escape, and open at D where the wool, cotton, or other substance is discharged.

In order more easily to explain the position and manner of constructing the several parts, we will present an end view of the feeder and shell, together with an end view of a picker cylinder, and of the rollers which move the creeper cloth, each part in its relative position, detachable from the bonnet or covering within which it operates.

At E, Fig. 2, is a picker cylinder with ten lags which contain the teeth. Said lags are bolted on to two iron rings (if over 30 inches long three rings will be needed). Into these lags we insert teeth one and one-half inch apart (either more or less to order,) and so set in the different lags that only one tooth follows in the same track each revolution of the cylinder.

At F is a picker tooth of cast-steel $\tfrac{5}{16}$ of an inch in diameter and about 5 inches long from the lag tapering $1\tfrac{1}{2}$ inches to a round point which is tempered.

At G, is a short bolt with a screw and nut at one end, and a hole at the other, which passes through the lag and against the picker tooth at right angles. Through said hole in the end of said bolt said picker tooth passes, as it is slipped easily through said lag against a gage stick represented at L, Fig. 3, which stick is removed after the teeth are set fast by turning the screw nut, and by so progressing the teeth are all set with accuracy and despatch.

Fig. 3 represents a gage stick which is made temporarily fast across the picker frame—and a lag with the teeth in contact with it when said screw nut makes them fast. The picker teeth we set pitching forward in their whole length about $\tfrac{3}{4}$ of an inch, or as much as possible and permit them to run clear by the centrifugal force throwing off the fibers. It is well to have the teeth project inward an extra length which in time will be used up by repeated sharpening. See these teeth in lag H Fig. 3.

At I Fig. 2 is seen the end of a feeder. At J is seen the end of a shell placed under it. Said feeder receives the wool or cotton from the creeper cloth A, and causes it to slide on the shell J, until it is brought in contact with the teeth on the cylinder E, at which time the teeth on the feeder I, have pierced through the locks or fibers to be picked at the point K, where the locks are gradually and slowly presented and combed or picked over the edge of the shell at K. Said locks are kept in picking contact by the back of the shell which is made 5 or 6 inches wide, and in a concave form to suit the circumstances of the picker cylinder. The concave side of the shell toward the feeder is made more open on the side toward the creeper cloth, say from half to three fourths of an inch according to the material to be picked. The edge lying nearly in contact with the creeper cloth as it passes over the roller should be nearly to an edge. The edge of the shell at K, may be as near an edge as possible and not cut the fibers say $\frac{1}{16}$ of an inch thick.

It is common to move a picker cylinder with a superficial speed from 36 to 46 feet per second, and the feeders as the pulleys indicate, say one revolution of feeder to 16 revolutions of the picker cylinder. The speed and comparative motions admit of great variations as the work may require.

The feeder and shell may be made of any smooth and solid material. We have used cast iron for the shell grinding it smooth on the two concave sides. We have used cast and wrought iron for the spur wheels which constitute the feeder—the latter is preferable for most kinds of work. We stamp them out of sheet iron nearly $\frac{1}{10}$ of an inch thick. The precise diameter is not important. We have made them between 3 and 4 inches in diameter, including the spurs or teeth, with a hole in the center 1½ inches in diameter, which nearly resemble circular saws with teeth near ⅜ of an inch in length. These saws, or spur wheels are slipped on to an arbor or shaft against a shoulder with metal or wooden collars of about ¼ of an inch thick between each until the whole length required is obtained. When they are all made fast by a screw nut pressing them against said shoulder the collars between said saws or spurs ought to come out to the roots of the teeth.

The teeth of the feeder on the side next to the picker cylinder should pitch downward, and the teeth on the picker cylinder next to the feeder should also pitch downward. The top of said cylinder moves toward said feeder.

In the operation of the improved picker the picking is better done because very small matted locks are not permitted to escape without being opened and separated, they being held within ⅛ of an inch of the picker teeth before they are disengaged from the teeth of the feeder, and the shell holds the fibers suspended against the teeth of the picker cylinder and effectually prevents them from winding around an under feeder (there being none in our improved kind).

The improvement in setting and holding the picker teeth over the old plan is great, as they can be easily taken out and repointed and again set with accuracy and despatch by the picker tender or a small lad.

The objections to the old plan of having two feeders, are, that they cannot be made to hold the wool at a point sufficiently near the points of the picker teeth as to be sure to separate small matted locks—and not nearer than the semidiameter of the feeders—and if they are small will be extremely troublesome in winding up with the fibers.

The objections to the old method of driving the teeth fast into the lags of the cylinder are that they cannot be resharpened while in the cylinder and cannot be taken out and reset without rendering them loose and uneven, and as the points are constantly wearing off, it is important to have them arranged so as to be easily repaired and set over.

The difficulties in the old picker are overcome by the above named improvements.

What we claim as our invention and desire to secure by Letters Patent is:—

1. The combination of the feeder and shell, and also their combination with the picker cylinder as described.

2. We also claim the method of holding and setting the teeth in the lags by means of the screw staples or bolts as described.

GEO. C. KELLOGG.
PHINEAS GILLET.

Witnesses:
TERTIUS WADSWORTH,
GEO. R. JEWETT.